United States Patent
Wang et al.

(10) Patent No.: US 9,937,913 B2
(45) Date of Patent: *Apr. 10, 2018

(54) METHODS AND SYSTEMS FOR HYBRID DRIVELINE CONTROL

(71) Applicant: Ford Global Technologies, LLC, Dearborn, MI (US)

(72) Inventors: Xiaoyong Wang, Novi, MI (US); Wei Liang, Farmington Hills, MI (US); Rajit Johri, Canton, MI (US); Francis Thomas Connolly, Ann Arbor, MI (US); Daniel Colvin, Farmington Hills, MI (US); Ming Lang Kuang, Canton, MI (US); Ryan Abraham McGee, Shanghai (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,106

(22) Filed: May 18, 2015

(65) Prior Publication Data
US 2015/0246669 A1 Sep. 3, 2015

Related U.S. Application Data

(63) Continuation of application No. 14/016,938, filed on Sep. 3, 2013, now Pat. No. 9,067,594.

(51) Int. Cl.
| | |
|---|---|
| *B60W 20/00* | (2016.01) |
| *B60W 10/08* | (2006.01) |
| *B60W 30/20* | (2006.01) |
| *B60W 10/02* | (2006.01) |
| *B60K 6/48* | (2007.10) |
| *F16H 61/14* | (2006.01) |
| *B60W 10/06* | (2006.01) |

(Continued)

(52) U.S. Cl.
CPC .......... *B60W 20/108* (2013.01); *B60K 6/48* (2013.01); *B60W 10/02* (2013.01); *B60W 10/023* (2013.01); *B60W 10/026* (2013.01); *B60W 10/06* (2013.01); *B60W 10/08* (2013.01); *B60W 10/115* (2013.01); *B60W 20/14* (2016.01); *B60W 20/40* (2013.01); *B60W 30/18136* (2013.01); *B60W 30/20* (2013.01); *F16H 61/143* (2013.01); *B60K 2006/4825* (2013.01);

(Continued)

(58) Field of Classification Search
CPC .... B60W 20/108; B60W 30/20; B60W 10/02; B60W 10/026; B60W 10/08; B60K 6/48; F16H 61/143; Y10S 903/93
USPC ......................................................... 701/22
See application file for complete search history.

(56) References Cited

U.S. PATENT DOCUMENTS

| | | |
|---|---|---|
| 5,021,038 A | 6/1991 | Beigang |
| 5,163,530 A | 11/1992 | Nakamura et al. |

(Continued)

OTHER PUBLICATIONS

Anonymous, "Method of Detecting Engine Combustion Degradation in a HEV," IPCOM No. 000064093, Published Feb. 18, 2005, 2 pages.

*Primary Examiner* — Jerrah Edwards
*Assistant Examiner* — Majdi Alsomiri
(74) *Attorney, Agent, or Firm* — David Kelley; McCoy Russell LLP

(57) ABSTRACT

Systems and methods for operating and hybrid driveline are presented. In one example, driver demand torque may be supplied to vehicle wheels via a hydraulic torque path and a friction torque path. Torque is distributed between the friction torque path and the hydraulic torque path in a way that ensures that driver demand torque is met and the friction torque path transfers torque up to its capacity.

19 Claims, 4 Drawing Sheets

(51) Int. Cl.
  *B60W 10/115* (2012.01)
  *B60W 30/18* (2012.01)
  *B60W 20/40* (2016.01)
  *B60W 20/14* (2016.01)
  *B60W 50/00* (2006.01)

(52) U.S. Cl.
  CPC ......... *B60W 2050/0091* (2013.01); *B60W 2510/0233* (2013.01); *B60W 2510/108* (2013.01); *B60W 2510/1015* (2013.01); *B60W 2510/1085* (2013.01); *B60W 2520/10* (2013.01); *B60W 2540/10* (2013.01); *B60W 2710/027* (2013.01); *B60W 2710/081* (2013.01); *B60W 2710/083* (2013.01); *B60Y 2400/426* (2013.01); *Y02T 10/6252* (2013.01); *Y02T 10/6286* (2013.01); *Y10S 903/902* (2013.01); *Y10S 903/93* (2013.01); *Y10T 477/26* (2015.01); *Y10T 477/30* (2015.01); *Y10T 477/32* (2015.01); *Y10T 477/328* (2015.01)

(56) References Cited

U.S. PATENT DOCUMENTS

| | | | |
|---|---|---|---|
| 6,364,807 B1 | 4/2002 | Koneda et al. | |
| 7,644,812 B2 | 1/2010 | Simpson et al. | |
| 8,596,390 B2 | 12/2013 | Soliman et al. | |
| 2007/0080005 A1 | 4/2007 | Joe | |
| 2009/0145673 A1 | 6/2009 | Soliman et al. | |
| 2009/0224713 A1 | 9/2009 | Falkenstein | |
| 2010/0087290 A1 | 4/2010 | Schoenek et al. | |
| 2012/0081051 A1 | 4/2012 | Kobayashi et al. | |
| 2012/0143419 A1 | 6/2012 | Yun | |
| 2012/0203417 A1 | 8/2012 | Matsui | |
| 2012/0323425 A1* | 12/2012 | Suyama | B60K 6/387 701/22 |
| 2013/0292195 A1* | 11/2013 | Gibson | B60K 6/48 180/53.1 |
| 2013/0296101 A1* | 11/2013 | Doering | B60K 6/48 477/4 |
| 2013/0296102 A1* | 11/2013 | Banker | B60W 10/196 477/4 |
| 2013/0297123 A1* | 11/2013 | Gibson | B60W 20/1084 701/22 |
| 2013/0331228 A1* | 12/2013 | Miyazaki | B60W 10/026 477/5 |
| 2014/0379232 A1* | 12/2014 | Kobayashi | B60K 6/48 701/67 |
| 2015/0072829 A1* | 3/2015 | Michikoshi | B60K 6/48 477/5 |
| 2015/0246670 A1* | 9/2015 | Ideshio | B60K 6/48 477/5 |

\* cited by examiner

METHODS AND SYSTEMS FOR HYBRID DRIVELINE CONTROL

CROSS REFERENCE TO RELATED APPLICATIONS

The present application is a continuation of U.S. patent application Ser. No. 14/016,938, entitled "METHODS AND SYSTEMS FOR HYBRID DRIVELINE CONTROL," filed on Sep. 3, 2013, the entire contents of which are hereby incorporated by reference for all purposes.

FIELD

The present description relates to a system and method for operating a hybrid vehicle driveline. The methods may be particularly useful for drivelines that include a torque converter and an electric machine.

BACKGROUND AND SUMMARY

A parallel hybrid driveline may include an engine, a driveline disconnect clutch, and an electric machine. The engine and electric machine may be selectively operated in response to vehicle operating conditions. If the engine is stopped, it may be restarted by the electric machine when the driveline disconnect clutch is closed. However, closing the driveline disconnect clutch to start the engine may cause a torque disturbance in the vehicle driveline because it may be difficult to accurately estimate torque transferred by the driveline disconnect clutch. Additionally, driveline inefficiencies may reduce the vehicle's fuel efficiency if the torque converter clutch is fully open during vehicle launch.

The inventors herein have recognized the above-mentioned disadvantages and have developed a method for operating a driveline, comprising: operating an electric machine in a torque control mode in response to a torque converter clutch torque capacity available at a transmission line pressure being greater than a driver demand torque; and operating the electric machine in a speed control mode in response to the torque converter clutch torque capacity available at the transmission line pressure being less than the driver demand torque.

By operating an electric machine in a speed control mode when transmission line pressure is low, it may be possible to reject driveline torque disturbances via the electric machine and deliver a desired driver demand torque. Additionally, by operating the electric machine in a torque control mode when transmission line pressure is higher, it may be possible to lock a torque converter clutch to improve driveline efficiency while providing at least a portion of driver demand torque via the electric machine.

The present description may provide several advantages. In particular, the approach may improve driveline efficiency while providing a desired driver demand torque. Additionally, the approach may improve vehicle drivability via improving vehicle launch. Further still, the approach may improve engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
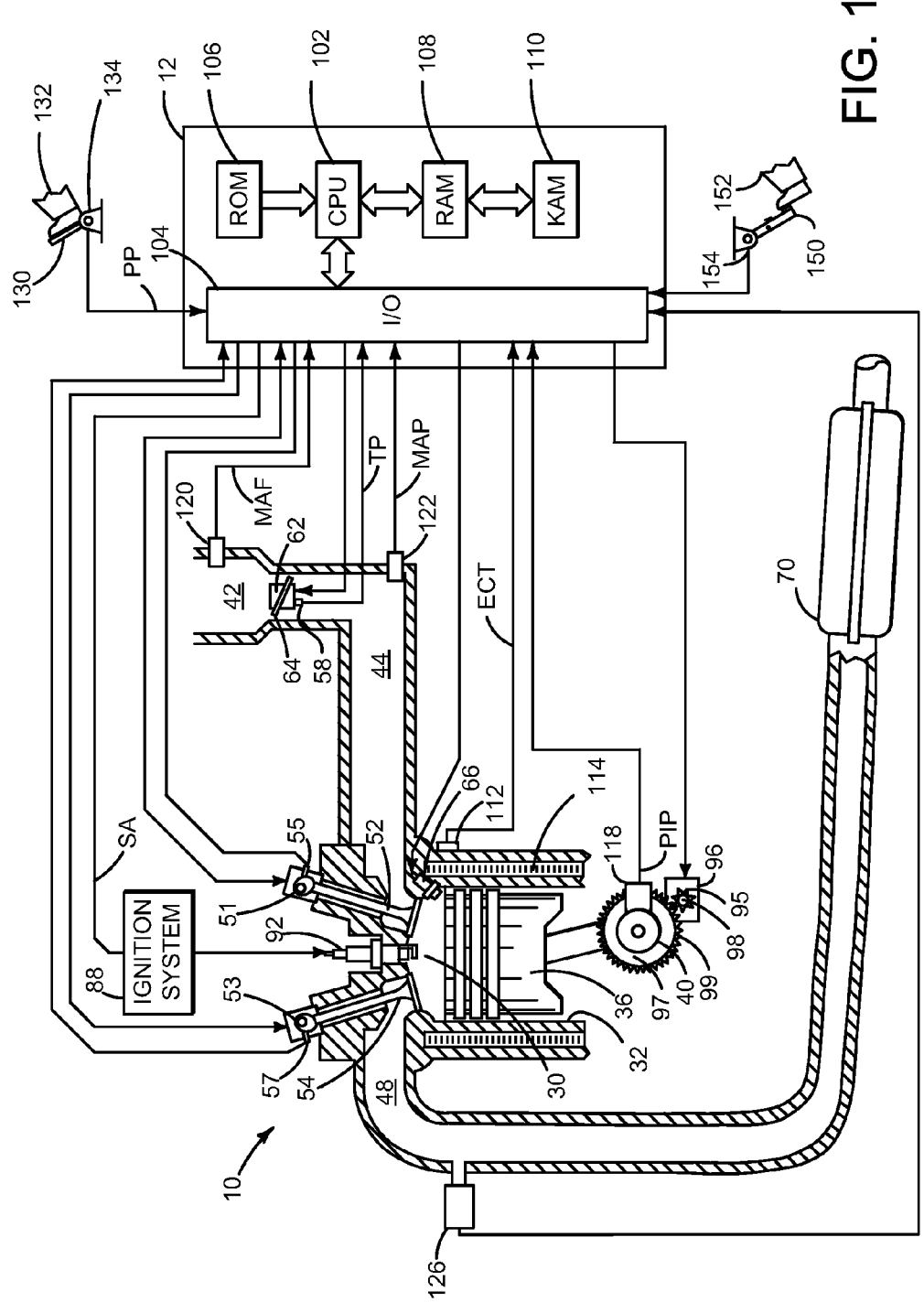
FIG. 1 is a schematic diagram of an engine.
Figure 2:
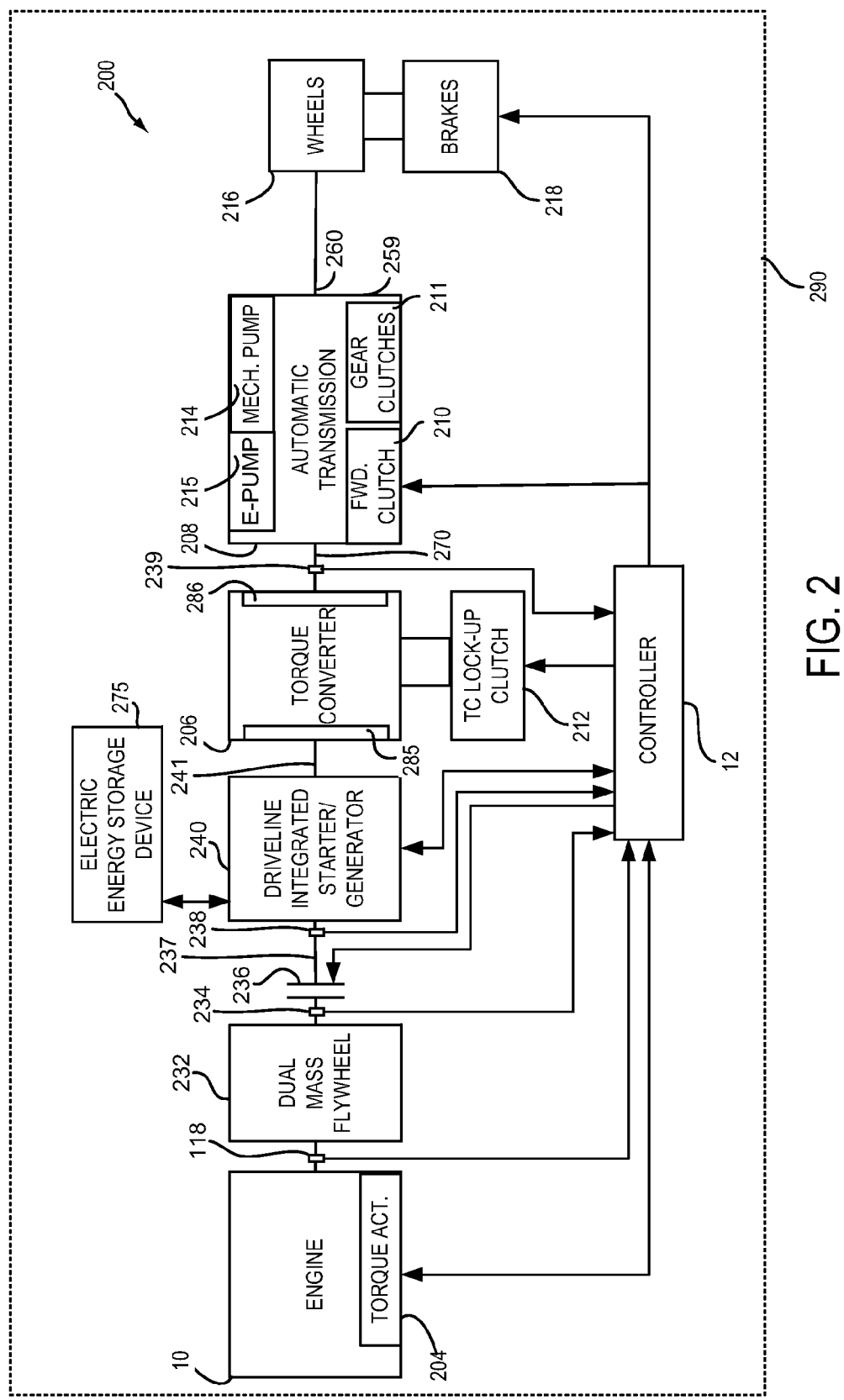
FIG. 2 shows an example vehicle driveline configuration.
Figure 3:
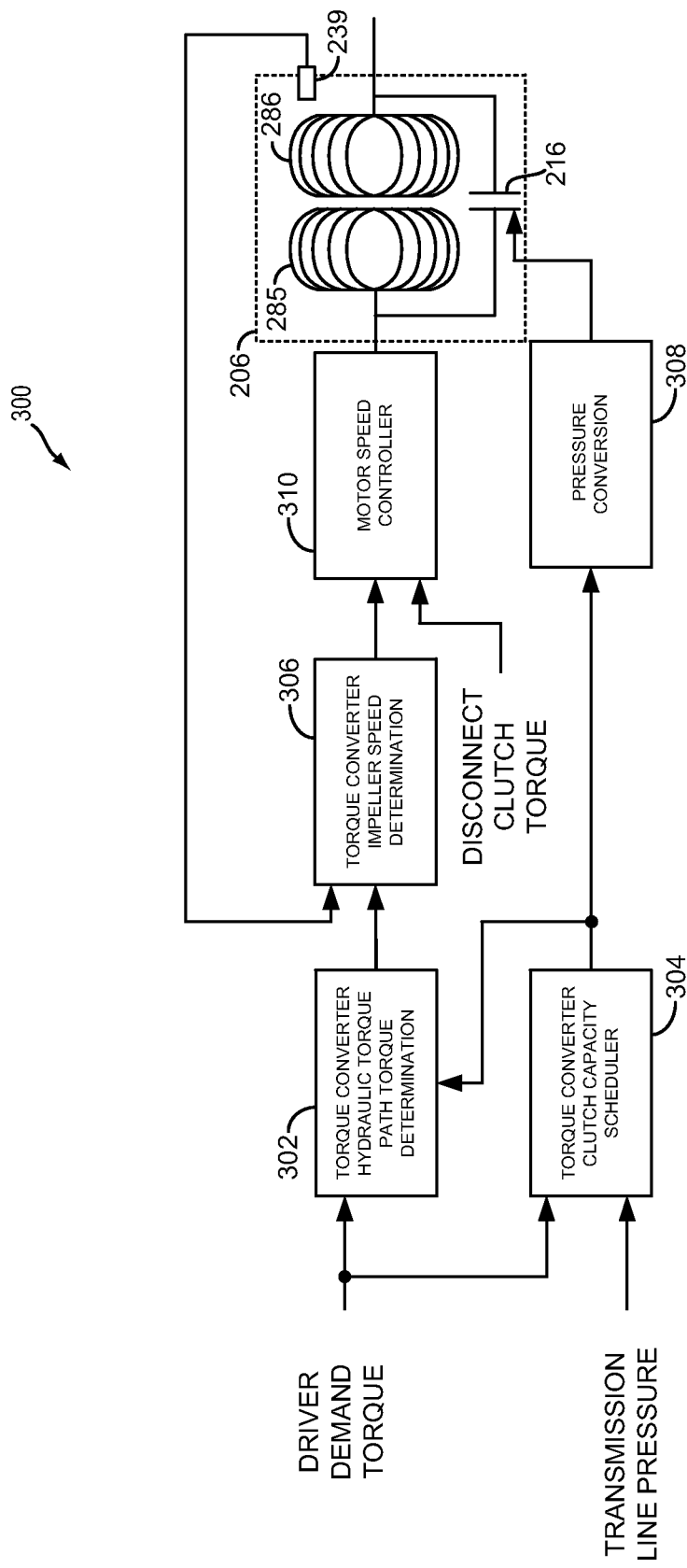
FIG. 3 shows an example control block diagram.
Figure 4:
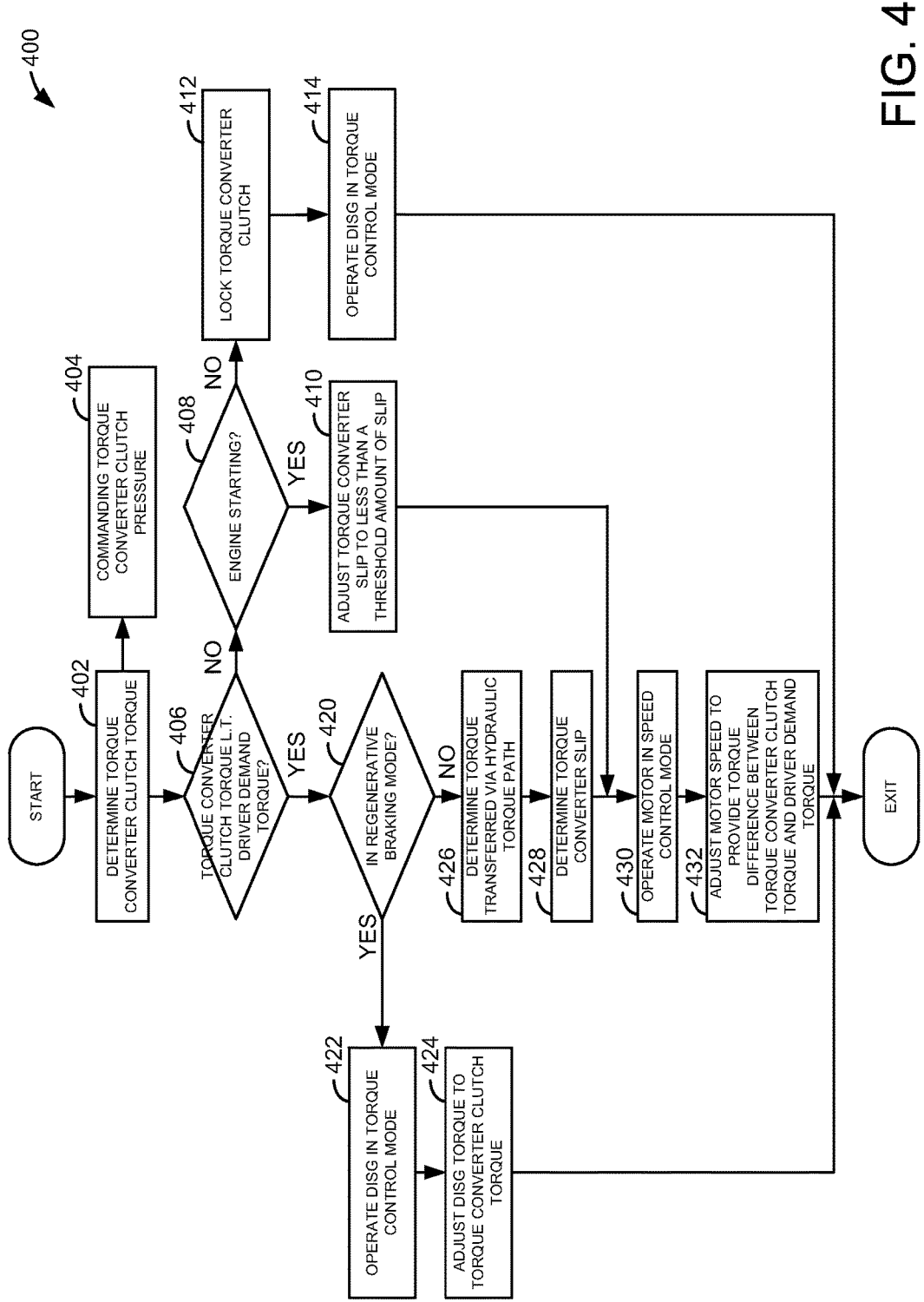
FIG. 4 shows a flowchart for a method for operating a vehicle driveline.

The present description is related to operating a driveline of a hybrid vehicle to provide a driver demand torque. The vehicle driveline may be comprised of an engine, driveline integrated starter/generator (DISG) or electric machine, and transmission as is shown in FIGS. 1-2. The driveline may be operated via a control system as shown in FIG. 3. FIG. 4 shows an example method for operating the vehicle driveline to improve driveline efficiency and vehicle drivability.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 may be positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is hydraulically operated via controller 12 adjusting a position of a control valve. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285 (e.g., a hydraulic torque path), thereby enabling torque multiplication. In contrast, when torque converter lock-up clutch 212 is fully engaged, the engine output torque is directly transferred via the torque converter clutch to an input shaft (not shown) of transmission 208 (e.g., the friction torque path). Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-10) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may control the engagement of wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical pump 214 may supply pressurized transmission fluid to automatic transmission 208 providing hydraulic pressure to engage various clutches, such as forward clutch 210, gear clutches 211, engine disconnect clutch 236, and/or torque converter lock-up clutch 212. Mechanical pump 214 may be operated in accordance with torque converter 206, and may be driven by the rotation of the engine or DISG via input shaft 241, for example. Thus, the hydraulic pressure generated in mechanical pump 214 may increase as an engine speed and/or DISG speed increases, and may decrease as an engine speed and/or DISG speed decreases.

An electric pump 215 may also be provided to increase transmission line pressure when the DISG is spinning at speeds less than 300 RPM for example. Electric pump 215 may be selectively operated via controller 12 in response to DISG speed. Thus, mechanical pump 214 may supply transmission line pressure when the DISG speed is greater than a threshold speed while electrical pump 215 is not activated. However, when DISG speed is less than the threshold speed, electrical pump 215 may be activated to supply transmission line pressure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When engine stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

The system of FIGS. 1 and 2 provides for a vehicle system, comprising: an electric machine; a torque converter in mechanical communication with the electric machine, the torque converter including a torque converter clutch; and a controller including non-transitory instructions executable to schedule torque converter clutch torque transfer capacity in response to a driver demand torque and a transmission line pressure. The vehicle system further comprises adjusting torque transferred between a torque converter impeller and a torque converter turbine in response to driver demand torque and the scheduled torque converter clutch torque transfer capacity (e.g., an amount of torque a torque converter clutch may transfer across a torque converter clutch at a pressure transmission fluid is being supplied to a torque converter clutch actuator).

The vehicle system further comprise a driveline integrated starter\generator in mechanical communication with the torque converter, and where adjusting torque transferred between the torque converter impeller and the torque converter turbine includes adjusting a speed of a driveline integrated starter generator. The vehicle system further comprises determining torque transferred via a hydraulic torque path between a torque converter impeller and a torque converter turbine in response to the driver demand torque and torque converter clutch torque capacity. The vehicle system further comprises additional instructions to operate the electric machine in a speed control mode in response to torque converter clutch capacity being less than the driver demand torque.

Referring now to FIG. 3, a control block diagram for operating a vehicle driveline is shown. The block diagram may be applied to the system shown in FIGS. 1 and 2. The block diagram may be implemented via the method shown in FIG. 4.

Driver demand torque is input to torque converter hydraulic torque path determination block 302 and torque converter clutch capacity scheduler block 304. In one example, driver demand torque is based on a position of an accelerator pedal and it represents a desired torque at the torque converter impeller. Alternatively, driver demand torque may be a vehicle wheel torque that may be converted to a torque converter turbine torque via accounting for gear ratios and driveline torque losses (e.g., wheel torque may be scaled via transmission gear ratios and driveline losses may be added to wheel torque to provide torque converter impeller torque). Transmission line pressure is also input to torque converter clutch capacity scheduler block 304. Transmission line pressure is a regulated pressure of mechanical pump 214 shown in FIG. 2. If mechanical pump output is at a high level, transmission fluid is regulated to a line pressure that is lower than pump output pressure. If mechanical pump output is at a lower level, transmission fluid may be at a line pressure that is the pressure output by the mechanical pump.

In addition, if DISG speed is less than a threshold speed, electric pump 215 of FIG. 2 may be activated to supply line pressure. Pressure from electric pump 215 may be regulated via a separate regulator or via adjusting power supplied to electric pump 215.

Torque converter clutch capacity scheduler block 304 may be implemented as a function or table that is indexed according to driver demand torque and transmission line pressure. Torque converter clutch capacity scheduler block 304 outputs a desired torque converter clutch torque. The desired torque converter clutch torque is an amount of torque the torque converter clutch is to be adjusted to transfer or output. For example, the desired torque converter clutch torque may be a torque transfer capacity of the torque converter clutch at the application force provided by transmission fluid delivered to operate the torque converter clutch. When the driver demand torque is implemented as a torque at the torque converter impeller, the desired torque converter clutch torque is adjusted to the driver demand torque if the transmission line pressure is high enough to enable the torque converter clutch to transfer the driver demand torque. If transmission line pressure is not sufficient to enable the torque converter clutch to transfer the driver demand torque, the desired torque converter clutch torque is adjusted to the highest torque that the transmission line pressure will allow the torque converter clutch to transfer.

In one example, transmission line pressure is used to index a table or function that describes a transfer function of the torque converter clutch. The transfer function outputs an amount of torque the torque converter clutch transfers at the pressure transmission fluid is being supplied to the torque converter clutch. Values that describe the transfer function may be empirically determined. If output from the torque converter transfer function is greater than or equal to the driver demand torque, the desired torque converter clutch torque may be adjusted to the driver demand torque. If output from the torque converter transfer function is less than the driver demand torque, the desired torque converter clutch torque may be adjusted to the amount of torque the torque converter clutch transfers at the present transmission line pressure. The desired torque converter clutch torque is input to the torque converter hydraulic torque path torque determination block 302 and the pressure conversion block 308.

Pressure conversion block 308 converts desired torque converter clutch torque into a pressure at which transmission fluid is to be applied to the transmission torque converter clutch actuator to transfer torque via the torque converter clutch at the desired torque converter clutch torque. In one example, desired torque converter clutch torque indexes a transfer function that outputs a torque converter clutch actuator pressure that is supplied to the torque converter clutch 216. Values in the transfer function may be empirically determined.

Torque converter hydraulic torque path torque determination block 302 outputs an amount of torque that is to be transferred in the hydraulic torque path (e.g., between the torque converter impeller and the torque converter turbine). The amount of torque that is to be transferred in the hydraulic torque path is the driver demand torque minus the desired torque converter clutch torque when the driveline is not in a regenerative braking mode.

Torque converter impeller speed determining block 306 outputs a desired torque converter impeller speed to motor speed control block 310. The desired torque converter impeller speed is output from a transfer function or a table. The values in the table or the function are determined by the design of the converter and experimental data and indexed via the amount of torque that is to be transferred in the hydraulic torque path and the torque converter turbine speed since the torque transferred in the torque converter's hydraulic torque path is a function of impeller speed and turbine speed.

Motor speed control block 310 operates DISG 240 shown in FIG. 2 in a speed control mode. For example, current supplied to DISG 240 is controlled based on a desired DISG speed. The desired DISG speed is adjusted to the desired torque converter impeller speed input to block 310 from block 306. Additionally, disconnect clutch torque may be input to motor speed controller block 310 as a feed forward torque adjustment to the desired DISG speed input.

DISG 240 provides torque to torque converter 206 which includes impeller 285 and turbine 286. Torque may be transferred from impeller 285 to turbine 286 via transmission fluid in a hydraulic torque path. Torque converter clutch 216 may also transfer torque across torque converter 206 in a friction path. Turbine speed sensor 239 monitors speed of turbine 286 and provides input to torque converter impeller determination block 306.

Thus, block diagram illustrates control of torque delivered to the transmission input shaft via hydraulic and friction torque paths. Torque delivered via the friction torque path is based on transmission line pressure so that the amount of torque transferred via the friction torque path is near the friction torque path's torque transfer limit at the present transmission line pressure.

Referring now to FIG. 4, a method for operating a vehicle driveline is shown. The method of FIG. 4 may be implemented in the system of FIGS. 1 and 2 as executable instructions stored in non-transitory memory.

At 402, method 400 determines desired torque converter clutch torque. In one example, desired torque converter clutch torque is adjusted to driver demand torque when transmission line pressure (e.g., regulated transmission fluid pump output pressure) is sufficient to allow torque equal to driver demand torque to be transferred via the torque converter clutch. If transmission line pressure is less than a transmission line pressure needed to transfer the driver demand torque via the torque converter clutch, the desired torque converter clutch torque is adjusted to the a torque within a predetermined torque range of a maximum torque the present transmission line pressure (e.g., transmission line pressure at the present time torque converter clutch torque is determined) allows the torque converter clutch to transfer.

Thus, the torque converter clutch torque may be limited to a torque that the present transmission line pressure allows the torque converter clutch to transfer across the torque converter when the transmission line pressure is applied to the torque converter clutch actuator. The torque converter clutch torque may be reduced to less than driver demand torque if the transmission is shifting or if the vehicle is being launched from a stopped state even if the transmission line pressure allows the driver demand torque to be transferred via the torque converter clutch. Further, the torque converter clutch may be purposefully slipped during shifting, vehicle launch, or during vehicle deceleration. In this way, a portion of driver demand torque supplied to vehicle wheels via the torque converter clutch may be increased as torque converter clutch torque capacity increases responsive to transmission line pressure. Similarly, a portion of driver demand torque supplied to vehicle wheels via the torque converter clutch may be decreased as torque converter clutch torque capacity decreases responsive to transmission line pressure.

Method 400 commands pressure of transmission fluid supplied to the torque converter clutch to provide the desired torque converter clutch torque at 404. In one example, the pressure of transmission fluid delivered to the torque converter clutch is regulated via a pulse width modulated solenoid valve.

At 406, method 400 judges whether or not desired torque converter clutch torque is less than (L.T.) driver demand torque. If method 400 judges that desired torque converter torque is less than driver demand torque, the answer is yes and method 400 proceeds to 420. Otherwise, the answer is no and method 400 proceeds to 408.

At 408, method 400 judges whether or not the engine is starting. In one example, method 400 may determine an engine is starting in response to engine rotation accelerating from zero speed to idle speed. If method 400 judges that the engine is starting, the answer is yes and method 400 proceeds to 410. Otherwise, the answer is no and method 400 proceeds to 412.

At 410, method 400 adjusts torque converter slip to less than a threshold amount of slip. For example, the transmission torque converter clutch may be commanded to a pressure that provides for less than 50 RPM slip between the torque converter impeller and the torque converter turbine. In addition, the torque converter clutch may be supplied transmission line pressure during engine starting to provide a low amount of slip at the present transmission line pressure. Thus, the torque converter may be supplied transmission fluid at a pressure regulated at the transmission pump output. Therefore, if transmission line pressure is low due to low transmission input speed, the torque converter clutch torque may be adjusted to a highest amount of torque available to transfer across the torque converter via the torque converter clutch at the present transmission line pressure. Supplying transmission fluid to the torque converter clutch at line pressure may reduce slip between the torque converter impeller and torque converter turbine. The torque converter slip may be adjusted via operating the DISG in a speed control mode and adjusting DISG speed relative to torque converter turbine speed. The DISG is not commanded to follow a torque in speed control mode; however, DISG torque may be adjusted so that DISG follows a desired speed in DISG speed control mode. Method 400 proceeds to 430 after the transmission torque converter clutch slip is adjusted.

At 412, method 400 locks the torque converter clutch. The torque converter clutch may be locked as soon as the transmission line pressure rises to a level sufficient to lock the torque converter. Method 400 proceeds to 414 after the transmission torque converter is locked.

At 414, method 400 operates the DISG in a torque control mode. The DISG may provide the total amount of driver demand torque or a fraction of driver demand torque (e.g., less than but not all driver demand torque). The DISG is not commanded to follow a speed in torque control mode. Rather, DISG torque is adjusted so that the DISG follows a desired torque in DISG torque control mode. If the engine is operating with the motor, the engine and motor torques may be adjusted to provide the driver demand torque. Method 400 proceeds to exit after the motor is operated in a torque control mode.

At 420, method 400 judges whether or not the hybrid driveline is in a regenerative braking mode (e.g., a mode where the vehicle's kinetic energy is converted to electrical energy via the DISG). In one example, method 400 may judge that the hybrid driveline is to be operated in a regenerative braking mode when driver demand torque is less than a threshold torque while vehicle speed is greater than a threshold vehicle speed. If method 400 judges that the driveline is to be operated in a regenerative braking mode, the answer is yes and method 400 proceeds to 422. Otherwise, the answer is no and method 400 proceeds to 426.

At 422, method 400 operates the DISG in a torque control mode. For example, the DISG is not commanded to follow a speed in torque control mode. Rather, DISG torque is adjusted so that the DISG follows a desired torque in DISG torque control mode. The DISG may be operated in a torque control mode via supplying current to the DISG based on a map or transfer function of the DISG that relates DISG current to DISG torque. The DISG current is adjusted to provide the desired DISG torque.

At 424, method 400 adjusts the desired DISG torque to the torque converter clutch torque. For example, a negative torque the DISG applies to the driveline is adjusted to the torque converter torque so that the DISG may convert torque transferred across the torque converter clutch into electrical energy and so that torque converter slip is less than a threshold amount of slip (e.g., less than 5 RPM slip). Method 400 proceeds to exit after DISG torque is adjusted.

At 426, method 400 determines the amount of torque to be transferred via the hydraulic torque path. Specifically, method 400 determines torque delivered via the hydraulic torque path based on a difference in torque between the torque transferred via the torque converter clutch and the driver demand torque. For example, driver demand torque minus torque transferred via the torque converter clutch (e.g., torque converter clutch capacity) equals desired hydraulic path torque. Method 400 proceeds to 428 after hydraulic path torque is determined.

At 428, method 400 adjusts DISG speed to provide the desired hydraulic path torque. In one example, the DISG speed is adjusted in response to torque converter turbine speed and the difference in torque between the torque converter clutch torque and the driver demand torque. For example, the torque converter turbine speed and a torque value that represents the difference in torque between the torque transferred via the torque converter clutch and the driver demand torque (e.g., the desired hydraulic torque path torque) are input to a torque converter model. The torque converter model outputs a desired torque converter impeller speed based on output of a torque converter transfer function that relates torque converter impeller speed to torque converter turbine speed and torque transferred via the hydraulic torque path. The difference between the desired torque converter impeller speed and the torque converter turbine speed is the torque converter slip. Method 400 proceeds to 430 after the desired torque converter impeller speed is determined.

At 430, method 400 operates the DISG in a speed control mode. In one example, current supplied to the DISG is adjusted in response to desired DISG speed. For example, DISG current may be adjusted to operate the DISG at a predetermined speed (e.g., 800 RPM). The DISG torque or current is not commanded to follow a desired DISG torque in speed control mode. Method 400 proceeds to 432 after the DISG enters speed control mode.

At 432, method 400 outputs current to the DISG. The current delivered to the DISG may be based on an error between a desired DISG speed, which is equivalent to torque converter impeller speed, and actual DISG speed. If the difference between actual DISG speed and desired DISG speed increases, the DISG current adjustment may increase proportionately as the speed difference increases. Similarly, if the difference between actual DISG speed and desired DISG speed decreases, the DISG current adjustment may decrease proportionately as the speed difference decreases.

Thus, the method of FIG. 4 provides for operating a driveline, comprising: operating an electric machine in a torque control mode in response to a torque converter clutch torque (e.g., torque that a torque converter clutch transfers across a torque converter) available at a transmission line pressure being greater than a driver demand torque; and operating the electric machine in a speed control mode in response to the torque converter clutch torque available at the transmission line pressure being less than the driver demand torque. In some examples, the electric machine may be operated in a speed control mode in response to engine start. The method includes where the electric machine is a driveline integrated starter/generator. The method further comprises adjusting a torque converter impeller speed in response to a torque converter turbine speed and a difference between driver demand torque and torque transferred across a torque converter via a torque converter clutch.

In some examples, the method further comprises operating the electric machine in a torque control mode instead of the speed control mode in response to the driveline operating in a regenerative braking mode. The method includes where the transmission line pressure is a regulated transmission pump outlet pressure and DISG torque is adjusted in response to the torque converter clutch capacity. The method also includes where the transmission line pressure is applied to the torque convert clutch, and further comprising adjusting torque converter clutch torque to equal the driver demand torque. The method further comprises adjusting a speed of the electric machine in response to driver demand torque while operating the electric machine in the speed control mode. In another example, the method of FIG. 4 provides for operating a driveline, comprising: adjusting a torque converter clutch to transfer a first portion of a driver demand torque to vehicle wheels; and adjusting speed of a torque converter impeller in response to a difference in the driver demand torque and the first portion of the driver demand torque. The method includes where a torque delivered across a converter clutch and a torque transferred between the torque converter impeller and a torque converter turbine equal the driver demand torque. The method further comprises adjusting torque converter slip to be maintained above a minimum threshold amount of slip during engine starting when torque transferable across the torque converter via the torque converter clutch is greater than a driver demand torque.

In some examples, the method includes where torque transferable across the torque converter via the torque converter clutch is estimated based on transmission line pressure, and where the first portion of driver demand torque is based on torque converter clutch capacity at a transmission line pressure at a time of adjusting the torque converter clutch. The method includes where the torque converter clutch is adjusted to transfer the driver demand torque across a torque converter in response to transmission line pressure. The method also includes where the speed of the torque converter impeller is further adjusted in response to torque converter turbine speed. The method includes where the torque converter impeller speed is adjusted via a driveline integrated starter/generator.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
   operating an electric machine coupled to an engine through a disconnect clutch in a torque control mode in response to a torque converter clutch torque capacity available at a transmission line pressure being greater than a driver demand torque; and
   operating the electric machine in a speed control mode in response to the torque converter clutch torque capacity available at the transmission line pressure being less than the driver demand torque, the electric machine positioned between the disconnect clutch and a torque converter.

2. The method of claim 1, wherein the engine is a direct injection engine, and further comprising:
   activating an electric pump to supply the transmission line pressure in response to a speed of the electric machine being less than a threshold.

3. The method of claim 2, wherein the engine is coupled to a dual mass flywheel.

4. The method of claim 3, wherein the dual mass flywheel is coupled between the engine and the disconnect clutch.

5. The method of claim 3, wherein the electric machine is a driveline integrated starter/generator, and where the electric machine is operated in the speed control mode during an engine start.

6. The method of claim 1, further comprising adjusting a torque converter impeller speed in response to a torque converter turbine speed and a difference between driver demand torque and torque transferred across the torque converter via a torque converter clutch; and
   further comprising adjusting a desired torque converter clutch torque to the driver demand torque when the transmission line pressure is a threshold pressure where the torque converter clutch has capacity to transfer the driver demand torque.

7. The method of claim 1, further comprising operating the electric machine in the torque control mode instead of the speed control mode in response to the driveline operating in a regenerative braking mode; and
   further comprising adjusting a desired torque converter clutch torque to a torque based on the transmission line pressure when the transmission line pressure is insufficient for a torque converter clutch to transfer the desired torque converter clutch torque.

8. The method of claim 1, further comprising adjusting a torque of the electric machine in response to a driver demand braking torque or the torque converter clutch torque capacity.

9. The method of claim 1, where the transmission line pressure is applied to a torque converter clutch; and
further comprising adjusting torque converter clutch torque to equal the driver demand torque.

10. The method of claim 1, further comprising adjusting a speed of the electric machine in response to driver demand torque while operating the electric machine in the speed control mode; and
further comprising determining an amount of torque to transfer via a hydraulic torque path based on the driver demand torque minus a desired torque converter clutch torque.

11. A method for operating a driveline, comprising:
adjusting a torque converter clutch to transfer a first portion of a driver demand torque to vehicle wheels;
adjusting speed of a torque converter impeller in response to a difference in the driver demand torque and the first portion of the driver demand torque; and
adjusting a disconnect clutch coupled between a torque converter that includes the torque converter clutch and an engine.

12. The method of claim 11, where a torque delivered across a converter clutch and a torque transferred between the torque converter impeller and a torque converter turbine equal the driver demand torque.

13. The method of claim 12, further comprising adjusting a motor speed based on a disconnect clutch torque; and
further comprising activating an electric pump to supply a transmission line pressure in response to the motor speed being less than a threshold.

14. The method of claim 13, further comprising adjusting the motor speed based on the torque converter impeller speed; and
further comprising adjusting a desired torque converter clutch torque to the driver demand torque when the transmission line pressure is a threshold pressure where the torque converter clutch has capacity to transfer the driver demand torque.

15. The method of claim 11, where the torque converter clutch is adjusted to transfer the driver demand torque across the torque converter in response to transmission line pressure.

16. The method of claim 11, where the speed of the torque converter impeller is further adjusted in response to torque converter turbine speed.

17. The method of claim 11, where the torque converter impeller speed is adjusted via a driveline integrated starter/generator.

18. A vehicle system, comprising:
an engine, where the engine is a direct injection turbocharged engine with variable cam timing;
an electric machine;
a disconnect clutch coupled between the electric machine and the engine;
a torque converter in mechanical communication with the electric machine, the torque converter including a torque converter clutch; and
a controller including non-transitory instructions executable to schedule torque converter clutch torque transfer capacity in response to a driver demand torque and a transmission line pressure, and additional instructions to adjust a desired torque converter clutch torque to a torque based on the transmission line pressure when the transmission line pressure is insufficient for the torque converter clutch to transfer the desired torque converter clutch torque.

19. The vehicle system of claim 18, further comprising additional instructions to operate the electric machine in a speed control mode in response to torque converter clutch capacity being less than the driver demand torque.

* * * * *